(12) United States Patent
Krishnasamy et al.

(10) Patent No.: US 10,031,709 B2
(45) Date of Patent: Jul. 24, 2018

(54) SYSTEMS AND METHODS FOR PRINT JOB MANAGEMENT ON A PRINTING DEVICE

(71) Applicant: XEROX CORPORATION, Norwalk, CT (US)

(72) Inventors: Muralidaran Krishnasamy, Chennai (IN); Narayan Kesavan, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/387,836

(22) Filed: Dec. 22, 2016

(65) Prior Publication Data

US 2018/0181354 A1 Jun. 28, 2018

(51) Int. Cl.
*G06F 3/12* (2006.01)
*H04N 1/00* (2006.01)

(52) U.S. Cl.
CPC .......... *G06F 3/1263* (2013.01); *G06F 3/1205* (2013.01); *G06F 3/1211* (2013.01); *G06F 3/1231* (2013.01); *G06F 3/1267* (2013.01); *H04N 1/0005* (2013.01); *H04N 1/00042* (2013.01); *H04N 1/00633* (2013.01); *H04N 2201/0094* (2013.01)

(58) Field of Classification Search
CPC .............................. G06F 3/1263; G06F 3/1205
See application file for complete search history.

(56) References Cited

U.S. PATENT DOCUMENTS

| | | | | |
|---|---|---|---|---|
| 6,422,772 B1* | 7/2002 | Fisher, Sr. | ............. | B41J 11/006 271/145 |
| 6,559,961 B1* | 5/2003 | Isernia | ................... | B41J 11/006 358/1.12 |
| 2002/0171864 A1* | 11/2002 | Sesek | ...................... | G06K 15/00 358/1.15 |
| 2005/0010809 A1* | 1/2005 | Hayano | .................. | B65H 39/10 726/6 |
| 2005/0275875 A1* | 12/2005 | Jennings, Jr. | ......... | G06F 3/1205 358/1.15 |
| 2008/0262656 A1* | 10/2008 | Gauronski | ......... | G03G 15/5012 700/275 |

\* cited by examiner

*Primary Examiner* — Ibrahim Siddo

(57) ABSTRACT

Devices and methods for managing print jobs on a printing device having a plurality of output media trays are disclosed. The method includes monitoring a print job in an active state, the print job is associated with a predetermined output media tray. The print job being switched from the active state to a held state is detected based on a status of at least one of a first set of printing resources, print input conditions, and print output conditions being negative for the print job. A new incoming print job received at the printing device is identified. A second set of printing resources, print input conditions, and print output conditions are determined for the new incoming print job. Finally, the printing device is triggered to print the new incoming print job for producing prints via an alternate output media tray while the print job is in the held state.

32 Claims, 7 Drawing Sheets

SYSTEMS AND METHODS FOR PRINT JOB MANAGEMENT ON A PRINTING DEVICE

TECHNICAL FIELD

The presently disclosed embodiments relate to print management systems, and more particularly, systems and methods for print job management on a printing device having multiple output media trays.

BACKGROUND

Electronic printing devices have undergone leaps of innovation over the years to hone ubiquitous printing capabilities via Internet. One such electronic printing device is a multifunctional device that incorporates multiple functionalities, such as printing, scanning, and copying, in a single device. The multifunctional device generally includes input trays (e.g., a main tray and an auxiliary tray) for receiving media in the form of sheets that are routed along a media path to an output tray. The media path is coupled to a print engine that transfers an image, which is received as a print job, on to the media. The print job may be referred as a stream of data including print instructions and image data, expressed in a page description language, and having one or more pages.

Multifunctional devices can execute print jobs received from multiple sources such as a server, a scanner, a portable storage unit (e.g., a pen drive), and a networked user device (e.g., mobile phone). The multifunctional devices are typically adapted to manage multiple print jobs in an order that defines a print queue for sequential printing. However, a print job may go into a held state after one or more pages of the print job are marked by the print engine to stall further printing due to, for example, insufficiency of printing resources required for executing the print job. Such insufficiency of resources may correspond to: (1) an obstruction in the media path between an input media tray and a designated output media tray associated with the print job, (2) lack of printing resources such as media, ink or toners, and finishing units (e.g., stapler pins, hard cover, plastic spiral, etc.), or (3) inaccessible or blocked output media tray. Consequently, a next print job in the print queue has to wait indefinitely until a held print job is completed or deleted, which allows to maintain the integrity of the print job but causes inconvenience to other users, reduces full machine utilization, hampers productivity, and degrades the overall user experience.

Conventional approaches allow a user to intentionally interrupt an ongoing or active print job and manipulate the print queue for execution of an intended print job. While these approaches allow for selective execution of different print jobs, they are unable to tackle an ongoing print flow disruption by the held print job due to the required attributes being unavailable to execute the next print job. As a result, the execution of print jobs in the print queue is indefinitely delayed, thereby hampering the print productivity and compromising on user satisfaction from the multifunctional device.

Therefore, there exists a need for a robust technique that allows an incoming print job to be executed bypassing an earlier active print job that is in a held state.

SUMMARY

One embodiment of the present disclosure includes a computer-implemented method for managing print jobs, each having one or more pages, on a printing device having a plurality of output media trays to produce prints. The method includes monitoring a print job being printed by the printing device, the print job is in an active state. The print job is associated with a predetermined output media tray. The print job is detected being switched from the active state to a held state based on a status of at least one of a first set of printing resources, first print input conditions, and first print output conditions being negative for the print job. A new incoming print job received at the printing device is identified. A second set of printing resources, second print input conditions, and second print output conditions for the new incoming print job are determined. The printing device is triggered to print the new incoming print job for producing prints via an alternate output media tray while the print job is in the held state.

Another embodiment of the present disclosure includes a print around device for managing print jobs, each having one or more pages, on a printing device having a plurality of output media trays to produce prints. The print around device is in communication with an external memory. The print around device includes a checking module and an alter-execution module. The checking module is on a computer with a memory and a controller configured to monitor a print job being printed by the printing device, the print job is in an active state, where the print job is associated with a predetermined output media tray; detect the print job being switched from the active state to a held state based on a status of at least one of a first set of printing resources, first print input conditions, and first print output conditions being negative for the print job; identify a new incoming print job received at the printing device; and determine a second set of printing resources, second print input conditions, and second print output conditions for the new incoming print job. The alter-execution module located on the computer is configured to trigger the printing device to print the new incoming print job for producing prints via an alternate output media tray while the print job is in the held state.

Yet another embodiment of the present disclosure includes a non-transitory computer readable medium comprising computer-executable instructions for managing print jobs, each having one or more pages, on a printing device having a plurality of output media trays to produce prints. The non-transitory computer-readable medium includes instructions for monitoring a print job being printed by the printing device, the print job is in an active state, where the print job is associated with a predetermined output media tray; detecting the print job being switched from the active state to a held state based on a status of at least one of a first set of printing resources, first print input conditions, and first print output conditions being negative for the print job; identifying a new incoming print job received at the printing device; determining a second set of printing resources, second print input conditions, and second print output conditions for the new incoming print job; and triggering the printing device to print the new incoming print job for producing prints via an alternate output media tray while the print job is in the held state.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
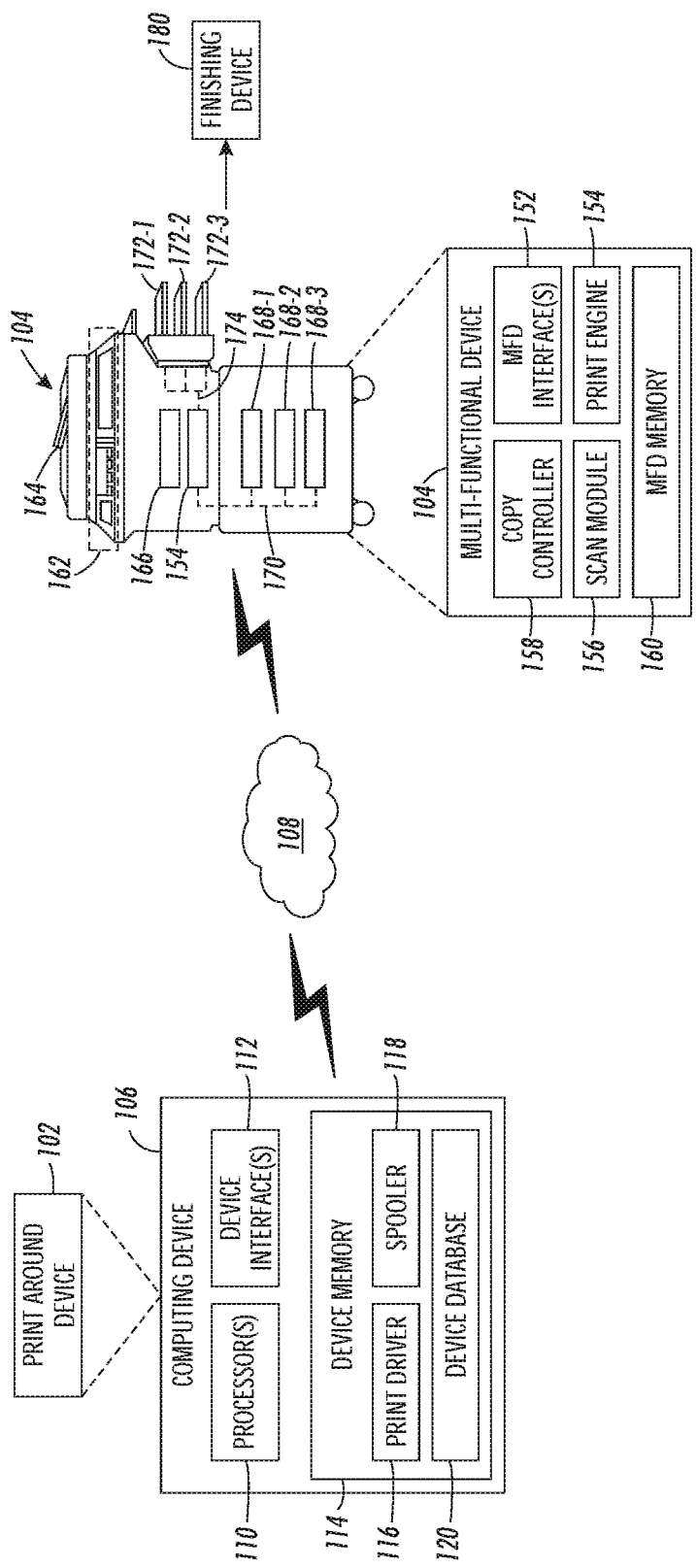
FIGS. 1-4 are schematics of network environments including an exemplary print around device (PAD), according to various embodiments of the present disclosure.
Figure 2:
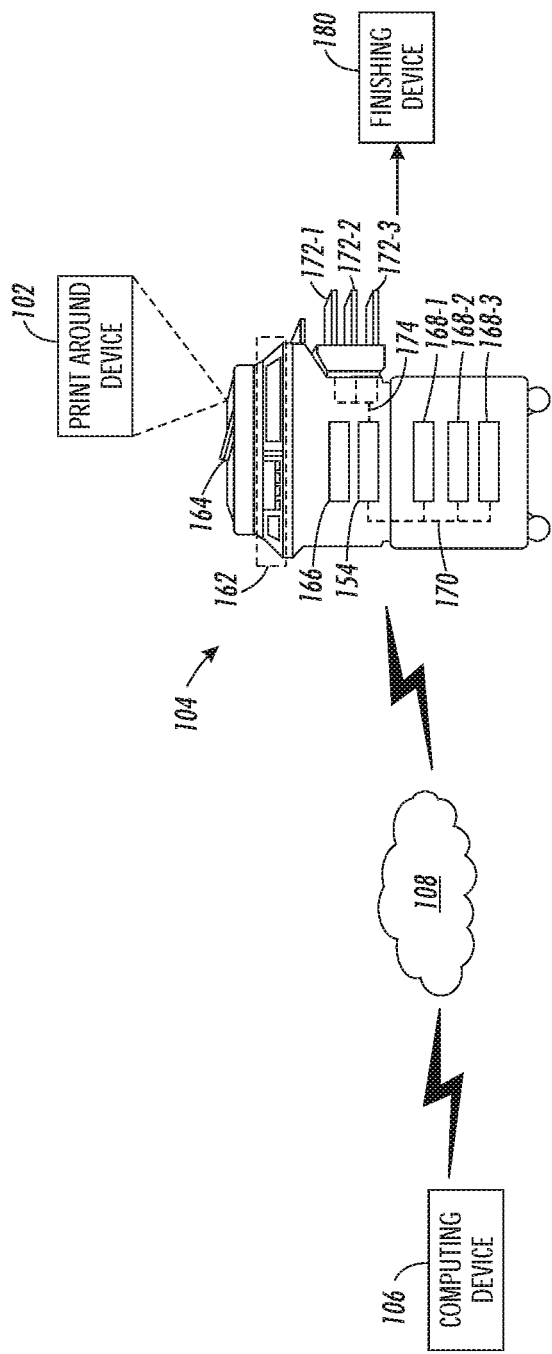
Figure 3:
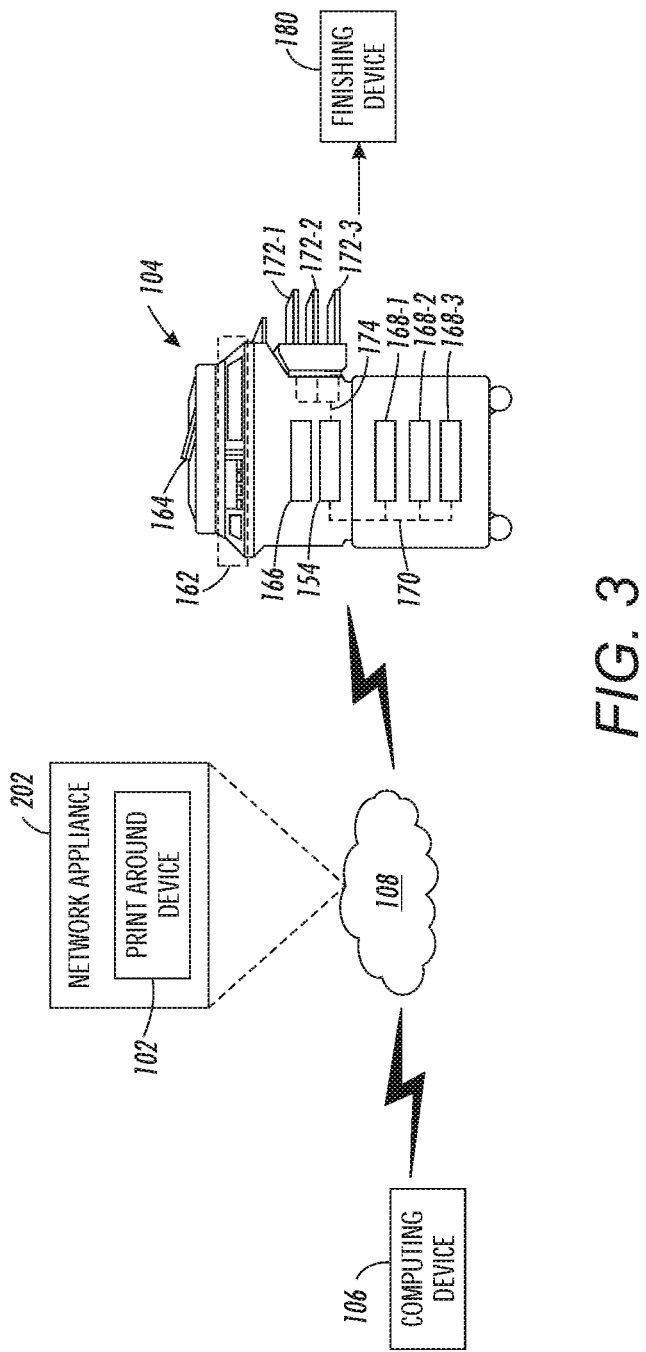

The following detailed description is provided with reference to the figures. Exemplary, and in some cases preferred, embodiments are described to illustrate the disclosure, not to limit its scope, which is defined by the claims. Those having ordinary skill in the art will recognize a number of equivalent variations in the description that follows without departing from the scope and spirit of the disclosure.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

A "file" is used in the present disclosure in the context of its broadest definition. The file refers to a computer readable, electronic file and related data in a variety of formats supporting storage, printing, or transfer of the file and related data over a communication channel. The file is capable of being editable or non-editable, encrypted or decrypted, coded or decoded, compressed or decompressed, and convertible or non-convertible into different file formats and storage schemas, or any combination thereof. The file is capable of being used by software applications to execute predetermined tasks or jobs.

A "document" is used in the present disclosure in the context of its broadest definition. The document refers to an electronic document including a single page or multiple pages. Each page may have text, images, embedded audios, embedded videos, embedded data files, or any combination thereof. The document may be a type of file.

A "multifunctional device" is used in the present disclosure in the context of its broadest definition. The multifunctional device (MFD) refers to a single device that performs traditionally multiple separate functionalities, such as printing, scanning, copying, and faxing a document. The multifunctional device participates in a network and communicate with various devices, users, and other entities such as an artificial intelligence system, or any combination thereof.

A "media," "medium," "input media," "input medium," "medium sheet," and "sheet" are used interchangeably in the present disclosure in the context of their broadest definition. The medium refers to a physical sheet of paper, plastic, cardboard, or any other suitable physical substrate that can pass through a media path associated with an electronic printing device such as the multifunctional device.

A "media path" is used in the present disclosure in the context of its broadest definition. The media path refers to a route followed by the media inside an electronic printing device such as the multifunctional device. The media path provides a flow communication between an input media tray and an output media tray via a print engine inside the multifunctional device.

An "input media path" is used in the present disclosure in the context of its broadest definition. The input media path refers to a media path between an input media tray and a print engine of an electronic printing device such as the multifunctional device.

An "output media path" is used in the present disclosure in the context of its broadest definition. The output media path refers to a media path between a print engine and an output media tray of an electronic printing device such as the multifunctional device.

A "print job" is used in the present disclosure in the context of its broadest definition. The print job refers to a set of one or more files, each having one or more electronic pages, subjected to printing.

An "active print job" is used in the present disclosure in the context of its broadest definition. The active print job refers to the print job in an active state with at least one electronic page being printed.

A "held state" is used in the present disclosure in the context of its broadest definition. The held state refers to a state of an event whose execution is paused due to various conditions including, but not limited to, an obstructed media path, insufficient printing resources (i.e., media, media size, ink or toners, finishing units, for example, stapler pins, hard cover, binding spiral coils, etc.), execution of another event, press of a designated button on the multifunctional device, or any combination thereof.

A "held print job" is used in the present disclosure in the context of its broadest definition. The held print job refers to the active print job in the held state.

An "incoming print job" and "new incoming print job" are used interchangeably in the present disclosure in the context of their broadest definition. The new incoming print refers to a print job received for printing after the active print job goes into the held state.

Overview

Various embodiments of the present disclosure describe systems and methods for print job management on a printing device such as a multifunctional device. The embodiments include a print around device that facilitates to bypass an active print job that goes in a held state and enable printing of a new print job, provided the multifunctional device has sufficient printing resources to execute the new print job. The print around device determines an output tray associated with a held print job and stores an instance as well as a print output status of the held print job in a memory. While the active print job is in the held state, the print around device triggers the multifunctional device to associate an alternate output tray with the new print job for being printed. After printing of the new print job is complete, the print around device triggers the multifunctional device to reassess the status of printing resources for the held print job and eventually resumes printing of the held print job if the printing resources are available. The print around device allows for print job continuity, better productivity, and enhanced utilization of the multifunctional device while maintaining print job integrity to improve user experience in a multi-user environment.

Exemplary Embodiments

FIGS. 1-4 are schematics of network environments including an exemplary print around device, according to various embodiments of the present disclosure. Embodiments are discussed in the context of a multifunctional device with multiple output media trays. However, in general, the embodiments can be implemented on any electronic printing device having more than one output media tray. The illustrated embodiments (FIGS. 1-4) include a print around device 102 (PAD 102) in communication with a multifunctional device 104 and a computing device 106, for example, a desktop PC, a laptop, a workstation, a personal digital assistant, a mobile phone, a tablet, a server, an Internet-of-things (IOT) device, an artificial intelligence system, etc., over a network 108. The network 108 may include any software, hardware, or computer applications that can provide a medium to exchange signals or data in any of the formats known in the art, related art, or developed later. The network 108 may include, but is not limited to, social media platforms implemented as a website, a unified communication application, or a standalone application. Examples of the social media platforms may include, but are not limited to, Twitter™, Facebook™, Skype™, Microsoft Lync™, Cisco Webex™, and Google Hangouts™. Further, the network 108 may include, for example, one or more of the Internet, Wide Area Networks (WANs), Local Area Networks (LANs), analog or digital wired and wireless telephone Networks (e.g., a PSTN, Integrated Services Digital Network (ISDN), a cellular network, and Digital Subscriber Line (xDSL), Wi-Fi, radio, television, cable, satellite, and/or any other delivery or tunneling mechanism for carrying data. The network 108 may include multiple networks or sub-networks, each of which may include, for example, a wired or wireless data pathway. The network 108 may include a circuit-switched voice network, a packet-switched data network, or any other network able to carry electronic communications. For example, the network 108 may include networks based on the Internet protocol (IP) or asynchronous transfer mode (ATM), and may support voice using, for example, VoIP, Voice-over-ATM, or other comparable protocols used for voice, video, and data communications.

The computing device 106 includes processor(s) 110, device interface(s) 112, and a device memory 114. The processor(s) 110 executes machine readable program instructions to (1) capture, analyze, manipulate (e.g., compress or decompress, etc.), and store images or textual data; (2) convert electronic documents into electronic images, or vice versa; (3) generate a print job including data, attributes, and job related instructions; (4) generate a print job with or without a desired finishing operation based on a user indication, for example, press of a button, an audio command, biometric or radio frequency identification (RFID) scan, etc.; (5) spool or buffer the print job in the device memory 114; (6) make the print job compatible with the PAD 102, the multifunctional device 104, or any network device; (7) communicate the print job to the PAD 102 or the multifunctional device 104; or any combination thereof. Examples of the processor(s) 110 may include, but not limited to, microprocessors, microcomputers, microcontrollers, digital signal processors, central processing units, state machines, logic circuits, and/or any devices that can manipulate signals based on operational instructions.

The device interface(s) 112 may include software interfaces (e.g., an application programming interface, a graphical user interface, etc.); hardware interfaces (e.g., cable connectors, a keyboard, a card reader, a barcode reader, a radio frequency identity (RFID) reader, a biometric scanner, an RFID scanner, an interactive display screen, a transmitter circuit, a receiver circuit, etc.); or both.

The device memory 114 may include any computer-readable medium, for example, a processor or multiple processors operatively connected together, volatile memory (e.g., RAM), non-volatile memory (e.g., flash memory, etc.), disk drive, etc., or any combination thereof. The device memory 114 may include one or more databases such as a device database 120, which may be sub-divided into further databases for storing electronic files. The device memory 114 may have one of many database schemas known in the art, related art, or developed later for storing the generated print jobs, a print queue, predefined or dynamically defined models, parameter values, and so on. For example, the device database 120 may have a relational database schema involving a primary key attribute and one or more secondary attributes. The computing device 106 may perform one or more operations including, but not limited to, reading, writing, deleting, indexing, segmenting, labeling, updating, modifying, and generating data, or a combination thereof, and may communicate the resultant data to various networked devices such as the multifunctional device 104.

The device memory 114 typically also includes a print driver 116 and a spooler 118. The print driver 116 assists to generate a print job by making a file to be printed compatible with the PAD 102 and/or a network device such as the multifunctional device 104. The print driver 116 may be either universal or specific to the type of multifunctional device 104 and may be written in any programming language known in the art, related art, or developed later. On the other hand, the spooler 118 may be a software program, along with an associated storage space in the device memory 114, which maintains an orderly sequence of print jobs at the computing device 106 for being sequentially fed to the multifunctional device 104. The spooler 118 temporarily buffers the print jobs in the associated storage space and queue them to be sent at a data rate that is synchronous with the rate of printing of the multifunctional device 104. The spooler 118 allows to free-up the processor(s) 110 to perform other local tasks of the computing device 106.

The multifunctional device 104 performs various operations and provide these operations as a service to network devices such as the computing device 106 in a multi-user environment. Examples of these operations may include copying or printing files, scanning physical documents, encrypting or decrypting documents, embedding one or more digital signatures on files, emailing the files, and so on.

The multifunctional device 104 may operate as a standalone device or as a peripheral device to a networked device such as the computing device 106. The multifunctional device 104 includes an MFD interface(s) 152 similar to the device interface(s) 112 discussed above. The multifunctional device 104 also includes an input section, a print engine 154, a scan module 156, an output section, a copy controller 158, and an MFD memory 160.

The MFD interface(s) 152 includes an operation panel 162 that allows interaction between the multifunctional device 104 and a user, manipulation of inputs (e.g., a print job, a scan job, files, etc.) received from network devices, and functionalities such as printing, scanning, copying, and so on being performed by the multifunctional device 104 as a standalone device. The operation panel 162 may include a keyboard and an interactive display such as a touchscreen display. The operation panel 162 may also allow communication with one or more input devices such as a smartcard, a microphone, a stylus pen, a keyboard, a scanner 166, and a camera, or any combination thereof. The operation panel 162 may further facilitate, but not limited to, (1) receiving electronic documents, user identification data (e.g., personal identification number (PIN)), and document manipulation data (e.g., a unique private key, a digital signature, etc.); (2) manipulating the documents; (3) printing and faxing media; (4) transmitting documents to a networked device such as the computing device 106; and (5) scanning and copying documents.

The input section includes a document feeder 164 for receiving media and physical documents being fed to the multifunctional device 104 for printing or scanning. The document feeder 164 allows to feed the media as a batch of multiple sheets for faster processing and is typically located above a glass, flatbed scan platen (not shown), which is over the scanner 166, such that a scan is accomplished by traversing the media on the scan platen over the scanner 166. In some designs, the multifunctional device 104 may include more than one scanner located along a media path of the multifunctional device 104. The scanner 166 is controlled by the scan module 156, which may be a cooperative or a self-contained unit including optical elements, electro-optic components, electronics, software, and mechanical support structures. The scan module 156, or a portion thereof, may be implemented as a plug-in or a standalone feature of the multifunctional device 104.

Figure 5:
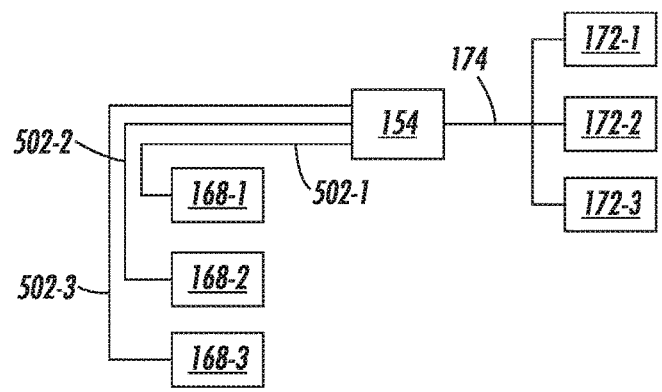
FIGS. 5-7 illustrate different schematics of media paths within a multifunctional device, which is in communication with the PAD of FIGS. 1-4, according to an embodiment of the present disclosure.
Figure 6:
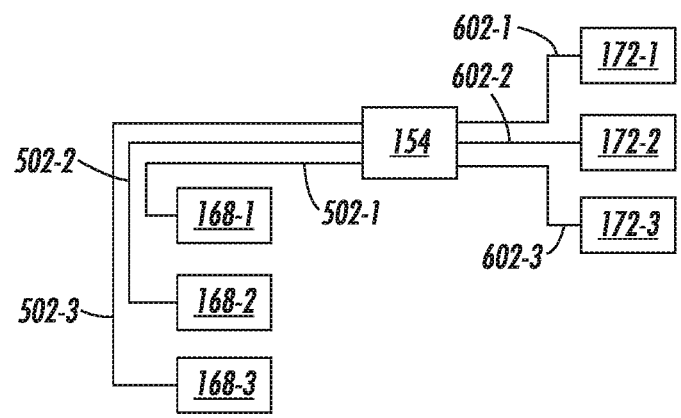

The input section further includes one or more input media trays 168-1, 168-2, and 168-3 (collectively, input media trays 168), each of which secure a media stack having one or more media. Each of the input media trays 168 include a platform (not shown) and one or more guide members (not shown). The guide members are movably adjusted for being placed adjacent to the media for temporarily and immovably securing the media on the platform. The media from the input media trays 168 are fed to the print engine 154 for being printed via an input media path such as an input media path 170, which is shared by the input media trays 168. However, in some embodiments, each of the input media trays 168 may have a separate input media path. For example, as illustrated in FIG. 5 and FIG. 6, the input media tray 168-1 is connected to an input media path 502-1; the input media tray 168-2 is connected an input media path 502-2; and the input media tray 168-3 is connected to an input media path 502-3. One having ordinary skill in the art would understand that the input media paths such as the input media paths 502-1, 502-2, and 502-3 (collectively, input media paths 502) may be either connected separately or as a common path with any combination of multiple input media trays, such as the input media trays 168.

The print engine 154 includes, e.g., a media feed mechanism, a printing head, etc., and serves to print the received data on a medium. The print engine 154 may be any of various engines known in the art, related art, or developed later including those corresponding to a line printer that prints in units of one line, a serial printer that prints in units of one character (such as and ink jet printer or a heat transfer printer), a page printer that prints in page units (such as a laser printer), or the like. In one example, the print engine 154 may be a xerographic engine.

Figure 7:
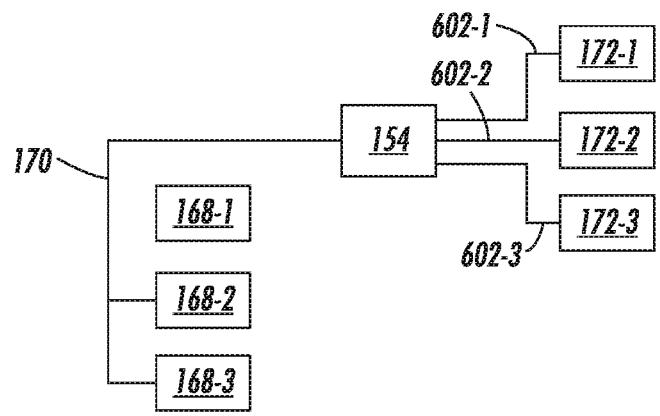

In one embodiment, the output section of the multifunctional device 104 includes multiple output media trays 172-1, 172-2, and 172-3 (collectively, output media trays 172). As illustrated in FIG. 1, the output media trays 172 share a common output media path 174 with the print engine 154. However, in some embodiments, each of the output media trays 172 may have a distinct media path with the print engine 154 and one or more input media trays 168. For example, as illustrated in FIG. 6 and FIG. 7, the output media tray 172-1 is connected to an output media path 602-1; the output media tray 172-2 is connected an output media path 602-2; and the output media tray 172-3 is connected to an output media path 602-3. One having ordinary skill in the art would understand that the output media paths such as the output media paths 602-1, 602-2, and 602-3 (collectively, output media paths 602) are either connected separately or as a common path with any combination of multiple output media trays, such as the output media trays 172. Other embodiments may include any combination of a set of input media trays 168 with common or distinct input media paths 502 and a set of output media trays 172 with common or distinct output media paths 602, via the print engine 154.

Each hardware and software unit of the multifunctional device 104 including the output section, the input section, the MFD interface(s) 152, and the print engine 154 are controlled by the copy controller 158. Further, the copy controller 158 receives the print job including print data and high level commands or job related instructions, which are expressed in a page description language, from a network device directly or via the PAD 102. The copy controller 158 interprets the received high level language commands to call upon printing resources to generate a sheet specification, for example, length, width, margins, and other format parameters for different pages associated with the print job, and render a rasterized page data such as text, graphics, objects, or fonts. The rasterized page data is then serialized to the print engine 154 by the copy controller 158 for being printed on a medium. In essence, the copy controller 158 translates a data stream representing the received print job into a series of commands for directing the print engine 154 to produce prints. The copy controller 158 also handles a print queue, hereinafter referred to as MFD print queue, of the received print jobs at the multifunctional device 104. The MFD print queue may include an instance or object of print jobs that are sequentially arranged and buffered in a spooler memory (not shown), which is located in the device memory 114, at the computing device 106. In some embodiments, the MFD print queue may have an instance of a print job created at the multifunctional device 104. The MFD print queue may be maintained in the MFD memory 160, which may be any suitable memory unit known in the art, related art, or developed later including those discussed above.

In some embodiments, as illustrated in FIGS. 1-4, the multifunctional device 104 may be operably connected to a finishing device 180, which may receive the printed media from the output media trays 172 and perform various finishing operations on the printed media. Examples of the finishing operations may include, but not limited to, gathering, sorting, collating, stacking, stapling, binding, stitching, folding, cutting, and hole punching. The finishing device 180 may process the printed media at a rate equivalent to the output rate of the printed media from the multifunctional device 104. The finishing device 180 may be set up for each print job based on a finishing configuration being received from the multifunctional device 104 or, in some embodiments, the computing device 106. The finishing device 180 may include one or more types of finishing units, for example, hard cover, stapler pins, binding spiral coils, etc., to perform the finishing operations.

In a first exemplary network environment (FIG. 1), the computing device 106 communicates with the multifunctional device 104 over the network 108. The computing device 106 may be installed, integrated, or operated with the PAD 102 configured to at least one of: (1) communicate synchronously or asynchronously with one or more software applications, databases, storage devices, or appliances operating via same or different communication protocols, formats, database schemas, and platforms or any combination thereof, for receiving data; (2) determine, record, and analyze attributes (e.g., media size, media type, required toner type, required finishing operation, associated output media tray, etc.) of an earlier held print job and its print output status (i.e., no. of pages already printed); (3) receive, execute, communicate, formulate, train, or categorize one or more mathematical models to compare the attributes of an earlier active print job in a held state and those of an incoming print job; (4) manage the MFD print queue based on a comparison between the attributes of the earlier held print job and those of the incoming print job; (5) remove an object (or instance) of the earlier held print job from the print queue on the MFD 104 unless the MFD 104 has sufficient memory to additionally store or print the incoming print job; (6) store the removed object of the earlier held print job on the device memory 114, or a PAD memory 806 as configured; (7) determine an output media tray associated with the earlier held print job; (8) trigger the copy controller 158 to select an available alternate output media tray for execution of the incoming print job to produce prints via the selected alternate output media tray while the earlier active print job is in the held state; and (9) transfer or map the models, tasks, objects, data, parameters, attributes, print output status, earlier held print jobs, incoming print jobs, active print jobs, available and in-use output media trays 172, or any combination thereof to one or more networked computing devices and/or data repositories.

The PAD 102 represents any of a wide variety of devices capable of providing the selection of an alternate output media tray as a service for print job management while an earlier active print job is in a held state, to electronic printing devices and networked devices. Alternatively, the PAD 102 may be implemented as a software application or a device driver. The PAD 102 may enhance or increase the functionality and/or capacity of a network, such as the network 108, to which it is connected. In some embodiments, the PAD 102 may be also configured, for example, to perform e-mail tasks, security tasks, network management tasks including IP address management, and other tasks. In some other embodiments, the PAD 102 may be further configured to expose its computing environment or operating code to a user, and may include related art I/O devices, such as a keyboard or display. The PAD 102 of some embodiments may, however, include software, firmware, or other resources that support the remote administration and/or maintenance of the PAD 102.

In further embodiments, the PAD 102 either in communication with any of the networked devices such as the computing device 106 and the multifunctional device 104, or independently, may have video, voice or data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays, televisions, video output devices, video input devices, camcorders, etc.), or any other type of hardware, in any combination thereof. In some embodiments, the PAD 102 may comprise or implement one or more real time protocols (e.g., session initiation protocol (SIP), H.261, H.263, H.264, H.323, etc.) and non-real-time protocols known in the art, related art, or developed later to facilitate data transfer among the computing device 106, the multifunctional device 104, and the PAD 102, or any other network device.

In some embodiments, the PAD 102 may be configured to convert communications, which may include instructions, queries, data, etc., from the computing device 106 into appropriate formats to make these communications compatible with the multifunctional device 104 and vice versa. Consequently, the PAD 102 may allow implementation of the computing device 106 or the multifunctional device 104 using different technologies or by different organizations, for example, a third-party vendor, managing the multifunctional device 104 or associated services using a proprietary technology.

In a second embodiment (FIG. 2), the multifunctional device 104 may be integrated, installed, or operated with the PAD 102 implemented as a single or distributed multiple devices (not shown) that are operatively connected or networked together. In some embodiments, the PAD 102 may be a dedicated device to the multifunctional device 104 operating as a standalone device.

In a third embodiment (FIG. 3), the PAD 102 may be installed on or integrated with one or more network appliances, such as a network appliance 202 configured to establish the network 108 between the computing device 106 and the multifunctional device 104. At least one of the PAD 102 and the network appliance 202 may be capable of operating as or providing an interface to assist the exchange of software instructions and data among the computing device 106, the multifunctional device 104, and the PAD 102. In some embodiments, the network appliance 202 may be preconfigured or dynamically configured to include the PAD 102 being integrated with other devices. For example, the PAD 102 may be integrated with the computing device 106 (as shown in FIG. 1) or any other network device (not shown) connected to the network 108. The computing device 106 may include a module (not shown), which enables the computing device 106 being introduced to the network appliance 202, thereby enabling the network appliance 202 to invoke the PAD 102 as a service. Examples of the network appliance 202 include, but are not limited to, a DSL modem, a wireless access point, a router, a base station, and a gateway having a predetermined computing power and memory capacity sufficient for implementing the PAD 102.

Figure 4:
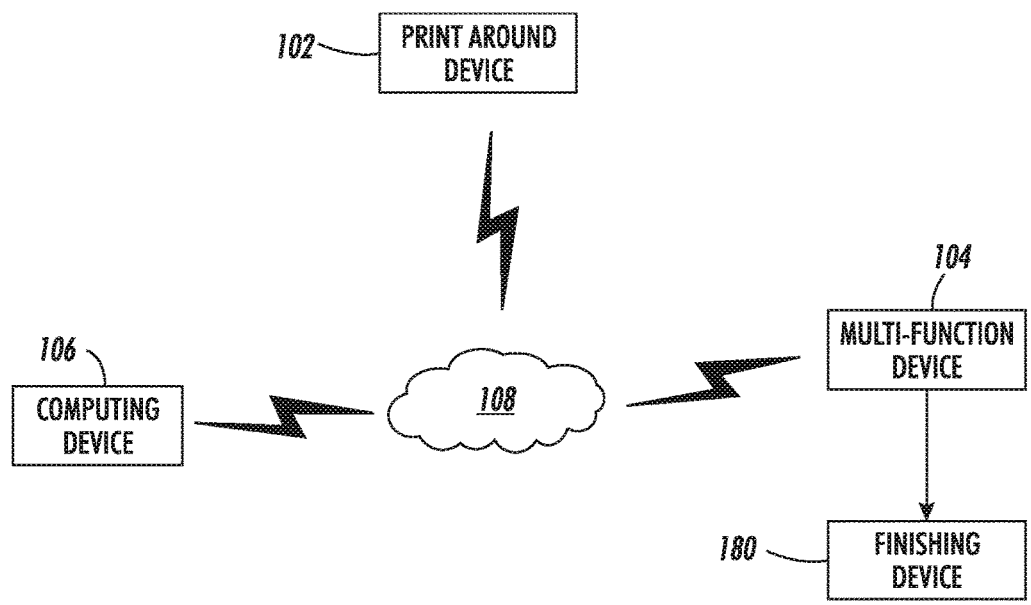

In a fourth embodiment (FIG. 4), the PAD 102 may operate as a standalone device. The PAD 102 may include its own PAD controller 802 (shown in FIG. 8) and a transmitter and receiver (TxRx) unit (not shown). In the embodiment of FIG. 4, the computing device 106, the multifunctional device 104, and the PAD 102 may be implemented as dedicated devices communicating with each other over the network 108. Accordingly, the PAD 102 may communicate directly with the networked devices (e.g., the computing device 106, the multifunctional device 104, etc.) using the TxRx unit.

Figure 8:
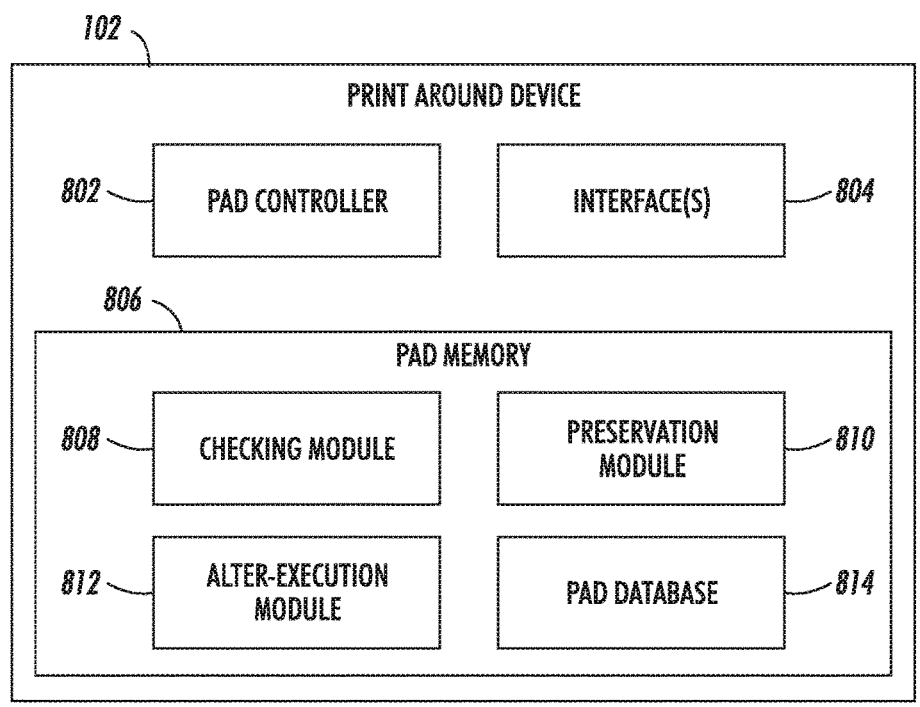
FIG. 8 is a schematic that illustrates the exemplary PAD of FIGS. 1-4, according to an embodiment of the present disclosure.

Further, as illustrated in FIG. 8, the PAD 102 may be implemented by way of a single device (e.g., a computing device, a processor or an electronic storage device) or a combination of multiple devices that are operatively connected or networked together. The PAD 102 may be implemented in hardware or a suitable combination of hardware and software. In some embodiments, the PAD 102 may be a hardware device including a PAD controller 802 executing machine readable program instructions to (1) communicate synchronously or asynchronously with one or more software applications, databases, storage devices, or appliances operating via same or different communication protocols, formats, database schemas, and platforms or any combination thereof, for receiving data; (2) determine, record, and analyze attributes (e.g., page size, page type, required toner type, print job size, required finishing operation, associated output media tray, etc.) of an earlier held print job and its print output status (i.e., no. of pages already printed); (3) receive, execute, communicate, formulate, train, or categorize one or more mathematical models to compare the attributes of an earlier active print job in a held state and those of an incoming print job; (4) manage MFD print queue based on a comparison between the attributes of the earlier held print job and those of the incoming print job; (5) temporarily remove an object (or instance) of the earlier held print job from the MFD print queue enabling the MFD 104 to have sufficient memory resources to print the incoming print job; (6) store the removed object of the earlier held print job with its attributes and the print output status on the device memory 114, or the PAD memory 806, or any combination thereof, as configured; (7) determine an output media tray associated with the earlier held print job; (8) indicate the copy controller 158 to select an available alternate output media tray for execution of the incoming print job to produce prints via the alternate output media tray while the earlier active print job is in the held state; and (9) transfer or map the models, tasks, objects, data, parameters, attributes, print output status, held print jobs, incoming print jobs, active print jobs, available and in-use output media trays 172, or any combination thereof to one or more networked computing devices and/or data repositories.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The PAD controller 802 may include, for example, microprocessors, microcomputers, microcontrollers, digital signal processors, central processing units, state machines, logic circuits, and/or any devices that manipulate signals based on operational instructions. Among other capabilities, the PAD controller 802 is configured to fetch and execute computer-readable instructions in the PAD memory 806 for performing tasks such as signal coding, data processing input/output processing, power control, and/or other functions.

In some embodiments, the PAD 102 may include, in whole or in part, a software application working alone or in conjunction with one or more hardware resources. Such software application may be executed by the PAD controller 802 on different hardware platforms or emulated in a virtual environment. Aspects of the PAD 102 may leverage known, related art, or later developed off-the-shelf software. Other embodiments may comprise the PAD 102 being integrated or in communication with a mobile switching center, network gateway system, Internet access node, application server, IMS core, service node, or some other communication systems, including any combination thereof. In some embodiments, the PAD 102 may be integrated with or implemented as a wearable device including, but not limited to, a fashion accessory (e.g., a wristband, a ring, etc.), a utility device (a hand-held baton, a pen, an umbrella, a watch, etc.), a body clothing, a safety gear, or any combination thereof. The PAD 102 may also include a variety of known, related art, or later developed interface(s) 804 such as those discussed above.

The PAD 102 further includes the PAD memory 806 for storing, at least, one of (1) a print job; (2) an earlier held print job, which is a print job in the held state; (3) files and related data including metadata, for example, data size, data format, creation date, associated tags or labels, related images, documents, messages or conversations, the MFD print queue, etc.; (4) a log of profiles of network devices and associated communications including instructions, queries, conversations, data, and related metadata; and (5) predefined or dynamically defined or calculated mathematical models, equations, or methods for print queue management and/or print job management on the multifunctional device 104.

The PAD memory 806 may comprise of any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. The PAD memory 806 may include one or more databases such as a PAD database 814, which may be sub-divided into further databases for storing electronic files. The PAD memory 806 may have one of many database schemas known in the art, related art, or developed later for storing the data, predefined or dynamically defined models, and parameter values. For example, the PAD database 814 may have a relational database schema involving a primary key attribute and one or more secondary key attributes. In some embodiments, the PAD 102 may perform one or more operations including, but not limited to, reading, writing, deleting, indexing, segmenting, labeling, updating, and modifying the data, or a combination thereof, and may communicate the resultant data to various networked computing devices. In one embodiment, the PAD memory 806 includes various modules such as a checking module 808, a preservation module 810, and an alter-execution module 812. Each of the modules operate in close communication with the copy controller 158 and influence the operation of the copy controller 158.

Checking Module

In one embodiment, the checking module 808 is preconfigured or dynamically configured to monitor a print queue on the multifunctional device 104. Such print queue (also referred to as MFD print queue) includes instances or objects of the print jobs being created at a network device such as the computing device 106 or the multifunctional device 104 itself. In one embodiment, the MFD print queue includes an instance of a print job being printed by the multifunctional device 104. While being printed, the print job is buffered in the MFD memory 160 and operate in an active state. Such an active print job may be tagged with predefined attributes at a service location (e.g., the computing device 106, the multifunctional device 104, or any other network device) where such print job is originally created. Examples of such attributes may include, but not limited to, media size (i.e., length, width, and thickness of media), media type (e.g., letter, A4, A3, etc.), toner or ink type, toner or ink color, and a desired finishing operation (e.g., gathering, sorting, collating, stacking, stapling, binding, stitching, folding, cutting, hole punching, etc.), and an associated output media tray of the multifunctional device 104, or any combination thereof. The finishing operation may be desired to be performed on a physical print of the active print job. The active print job is additionally associated with an output media tray by the copy controller 158. However, in some embodiments, the active print job may originally include instructions that designate a predetermined output media tray of the multifunctional device 104 at the time of creation to produce physical prints.

The checking module 808 is additionally configured to monitor the active print job for any change in its operational state and detect switching of the state from the active state to a held state. Such change to the held state may occur due to (1) a change in the availability status of printing resources, (2) change in print input conditions, or (3) change in print output conditions. Examples of printing resources may include, but not limited to, media, media size, toner or ink, toner or ink color, and finishing units (e.g., stapler pins, binding spiral coils, stitching wires, etc.), or any combination thereof. Further, the print input conditions may refer to a status of the input media path. The checking module 808 checks whether or not the input media path such as the input media path 170 is unobstructed, i.e., there is no media jammed in the input media path 170. Similarly, the checking module 808 checks the availability status of the associated output media tray in response to the print output conditions at that output media tray. The checking module 808 determines the associated output media tray as being unavailable when the print output conditions include, but not limited to, (1) the associated output media tray being blocked, inaccessible, or full with a stack of produced prints, (2) unavailability of the finishing units at a finishing device 180 operably connected to the associated output media tray, and so on. Such unavailability of the finishing units is communicated to the copy controller 158 by the finishing device 180 over the network 108.

Further, the checking module 808 is preconfigured or dynamically configured to determine a print output status of a held print job, i.e., the earlier active print job in the held state. The print output status may refer to a count of pages of the held print job that were completely printed when the active print job switched from the active state to the held state. The print output status provides a logical point from which printing of the earlier held print job may be resumed when the required printing resources, the print input conditions, and the print output conditions are favorable to print the previously held print job. Unlike a traditional interrupt used to manually or voluntarily stop an ongoing print job and halt the multifunctional device 104, the checking module 808 stops an active print job and put it into "held" state due to the lack of printing resources as well as unfavorable print input or print output conditions. As a result, the multifunctional device 104 may become non-functional to process any new incoming print job that requires the printing resources same as those for the held print job, until the held print job is completed or deleted. On contrary to the operation of the checking module 808, the typical interrupts place no restriction on the printing resources (e.g., only a specific output media tray being allowed) for execution of the new incoming print job. Moreover, state-of-the-art interrupts can be released manually or automatically, for example, after a system time out, whereas the checking module 808 is configured to allow execution of the new incoming print job only when specific printing resources (e.g., a specific output media tray) are available to execute the new incoming print job.

Furthermore, the checking module 808 is configured to identify a new incoming print job received at the multifunctional device 104. The incoming print job is an existing print job preceding the active print job in the MFD print queue. However, in some embodiments, the incoming print job may be a new print job being inserted into the MFD print queue and buffered at the multifunctional device 104. In one embodiment, the checking module 808 determines attributes of the incoming print job and compare them to the attributes of the earlier held print job to determine whether or not the printing resources required to print the incoming print job are available. The availability status of the printing resources, a status of the print input conditions, and a status of the print output conditions are communicated to the preservation module 810 by the checking module 808.

In one embodiment, when the printing of the incoming print job is complete, the checking module 808 checks the availability status of the printing resources, the print input conditions, and the print output conditions required to print the earlier held print job, which is a print job in the held state. If each of the status as well as input and output conditions are detected to be positive, the checking module 808 restores the attributes and the print output status of the earlier held print job stored from the external memory to the MFD memory 160 and provide an indication (e.g., a beep, an optical beam, a haptic feedback, etc.) to inform a user that the printing of the earlier held print job can be resumed. Upon receiving an input (e.g., press of a button, an audio command, biometric or RFID scan, etc.), from the user or, in some embodiments, automatically without a user input, the checking module 808 may insert the earlier held print job in the MFD print queue and trigger the copy controller 158 to switch a state of the earlier held print job from a held state to an active state. Upon being in the active state, the printing of the earlier held print job is resumed by the copy controller 158 to produce prints via the output media tray which is originally associated with the earlier held print job, which is now active. The copy controller 158 resumes printing the earlier held print job from a page succeeding a page number indicated by the print output status.

Preservation Module

The preservation module 810 may receive the availability status of the printing resources, the status of the print input conditions, and the status of the print output conditions required to print the incoming print job from the checking module 808. Each of these statuses may indicate to the preservation module 810 that whether or not the incoming print job is eligible to be printed ahead of the earlier held print job. When each of these statuses are positive, the preservation module 810 is preconfigured or dynamically configured to store a copy of the attributes and the print output status of the earlier held print job in the device memory 114 of the computing device 106. In some embodiments, the preservation module 810 may save the copy in the MFD memory 160 or the PAD memory 806. The preservation module 810 additionally removes the earlier held print job from the MFD print queue at the multifunctional device 104. On the other hand, when any of these statuses are negative, the preservation module 810 maintains or inserts an instance of the incoming print job behind an instance of the earlier held print job in the MFD print queue on the multifunctional device 104, and await printing of the earlier held print job for being completed. As a result, the incoming print job is deemed as ineligible to be printed ahead of the earlier held print job. The preservation module 810 communicates an eligibility status (e.g., positive for being 'eligible' or negative for being 'ineligible') of the incoming print job to the alter-execution module 812 for further processing.

Alter-Execution Module

The alter-execution module 812 may receive the eligibility status of the incoming print job from the preservation module 810. If the eligibility status is negative, the alter-execution module 812 remains dormant; however, when the eligibility status is positive, the alter-execution module 812 triggers the copy controller 158 to select an available alternate output media tray having favorable print output conditions as determined by the checking module 808. In some embodiments, the alter-execution module 812 may request or indicate a user to select an available alternate output media tray for being associated with the incoming print job. Based on the selection, the copy controller 158 associates the selected alternate output media tray with the incoming print job. When such association is complete, the alter-execution module 812 triggers the copy controller 158 to print the incoming print job for producing prints via the associated alternate output media tray while the earlier active print job is in the held state.

In some embodiments, the incoming print job may also switch from an active state to a held state, while being printed, due to unfavorable output conditions. In such conditions, the checking module 808, the preservation module 810, and the alter-execution module 812 may operate in tandem as discussed above to wait for the print output conditions and the print input conditions to become favorable for resuming the print operation of the incoming print job while focusing on the next incoming print job for execution. One having ordinary skill in the art would understand that the input media trays 168, each having a distinct input media path as illustrated in FIGS. 5-6 may allow the copy controller 158 to easily reach favorable print input conditions.

Figure 9:
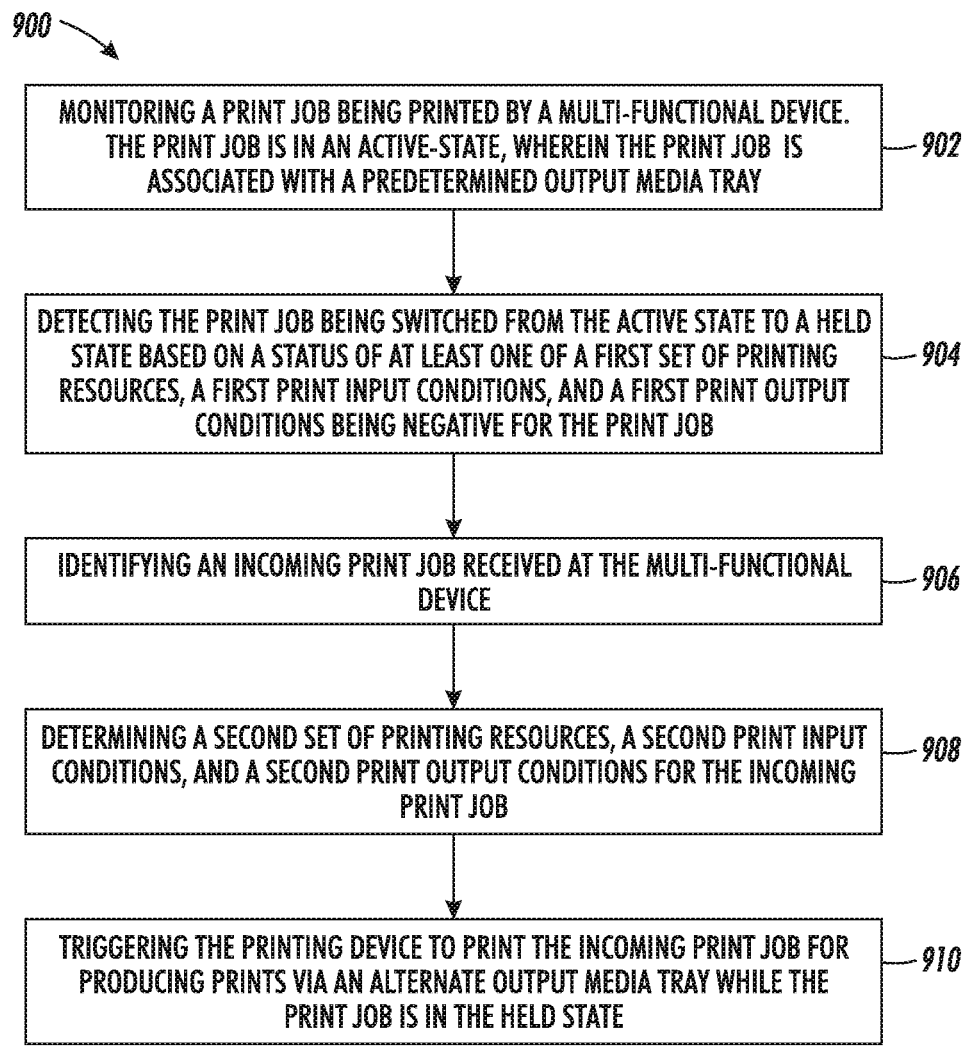
FIG. 9 is an exemplary method being performed by the PAD of FIGS. 1-4, according to an embodiment of the present disclosure.

FIG. 9 illustrates an exemplary method of implementing the PAD, according to an embodiment of the present disclosure. The exemplary method 900 may be described in the general context of computer-executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 900 is described is not intended to be construed as a limitation, and any number of the described method blocks may be combined or otherwise performed in any order to implement the method or an alternate method. Additionally, individual blocks may be deleted from the method without departing from the spirit and scope of the present disclosure described herein. Furthermore, the method 900 may be implemented in any suitable hardware, software, firmware, or combination thereof, that exists in the related art or that is later developed.

The method 900 describes, without limitation, implementation of the exemplary PAD 102. One of skill in the art will understand that the method 900 may be modified appropriately for implementation in various manners without departing from the scope and spirit of the disclosure.

At 902, a print job having an active state, i.e., being printed by a multifunctional device 104 is monitored. In one embodiment, a printing device such as the multifunctional device 104 operates as a peripheral device in communication with a network device such as the computing device 106 and receive a print job. Other embodiments may include the multifunctional device 104 operating as a standalone device capable of creating a print job. The print job may include image data and instructions, expressed in the form of any page description language known in the art, related art, or developed later including Postscript™ and PCL™. The print job may have one or more pages including text or images, or both.

The copy controller 158 of the multifunctional device 104 interprets the instructions in the print job to (1) obtain the attributes, (2) buffer the print job in the MFD memory 160, (3) arrange an instance of the print job in a print queue, and (4) associate an available output media tray with the print job. At this moment, the print job is in a neutral state. Upon being requested by a user, or automatically, the copy controller 158 switches a state of the print job from the neutral state to an active state representing the print job being printed by the multifunctional device 104. The copy controller 158 controls the printing of such active print job to produce physical prints via the associated output media tray. The active print job may be monitored by the checking module 808 for any change in state.

At 904, the print job being switched from the active state to a held state is detected. The active print job being printed may switch from the active state to the held state due to an unavailability of printing resources required to print the active print job, unfavorable print input conditions (e.g., a medium jammed in an input media path such as the input media path 170), or unfavorable print output conditions such as the associated output media tray being blocked, inaccessible, or full with a stack of produced prints. The checking module 808 detects such change in state of the active print job to transform into a held print job. In some embodiments, the held print job may have at least one page that is completely printed.

At 906, an incoming print job received at the multifunctional device 104 is identified. The checking module 808 operates in close communication with the copy controller 158 to detect and identify an incoming print job received at the multifunctional device 104. The incoming print job may be a buffered job existing in a print queue at the multifunctional device 104 or may be received by the multifunctional device 104 from a network device such as the computing device 106. The checking module 808 identifies the incoming print job by reading its attributes decoded by the copy controller 158. In some embodiments, the attributes of the incoming print job may be decoded by the checking module 808.

At 908, a second set of printing resources, print input conditions and print output conditions for the incoming print job are determined. The checking module 808 compares the attributes of the incoming print job with those of the held print job. The comparison allows the checking module 808 to determine whether or not a second set of printing resources are available to print the incoming print job. The checking module 808 indicates a status of the second set of printing resources as positive if they are available, else the status may be indicated as negative.

Upon determining that the second set of printing resources are available, the preservation module 810 stores data including the first set of attributes and the print output status of the held print job in an external memory such as the device memory 114 and the PAD memory 806. However, in some embodiments, the preservation module 810 may store the data in a local memory such as the MFD memory 160. Moreover, the print output status refers to a current count of printed pages of the held print job. The print output status allows a printing device such as the multifunctional device 104 to resume printing of the held print job when the first set of printing resources are available and the print output conditions are favorable, as discussed above.

Further, the checking module 808 also verifies a status of each of the print input conditions and the print output conditions for printing of the incoming print job to be enabled. In one embodiment, the checking module 808 may indicate the status of the print input conditions as being negative if the input media path is restricted, else the status may be indicated as positive. Similarly, the status of the print output conditions may be indicated as negative by the checking module 808 if the output tray or the output media path is restricted or inaccessible, else the status may be indicated as positive. The checking module 808 sends the statuses of the second set of printing resources, the print input conditions, and the print output conditions of the incoming print job to the alter-execution module 812.

At 910, the printing device is triggered to print the incoming print job for producing prints via the alternate output media tray. In one embodiment, the alter-execution module 812 associates an alternate output media tray of the multifunctional device 104 to the incoming print job provided the status of each of the second set of printing resources, the input print conditions, and the output print conditions is positive. A positive status for the output print conditions may indicate that at least one output media tray is unrestrictedly available for use to execute the incoming print job. Accordingly, the alter-execution module 812 associates the available output media tray to the incoming print job. This available output media tray, also referred to as an alternate output media tray, is alternate to the output media tray that is associated with the held print job. In some embodiments, the alter-execution module 812 may perform such association in response to a user input indicating a specific and available alternate output media tray for the incoming print job. Subsequently, the alter-execution module 812 triggers the copy controller 158 of the multifunctional device 104 to print the incoming print job to produce prints via the alternate output media tray. The incoming print job may be printed while the earlier active print job is in the held state, i.e., the held print job is temporarily removed from the MFD print queue for the MFD 104 to have sufficient memory resources to print the incoming print job.

Further, when the printing of the incoming print job is complete or the incoming print job switches from an active state to a held state, the checking module 808 checks for (1) the availability of the first set of printing resources required to print the earlier held print job, and that (2) the output conditions at the output print tray associated with the earlier held print job are favorable. If the statuses of the first set of printing resources, the print input conditions, and the print output conditions are positive, the checking module 808 restores data including the attributes and the print output status of the earlier held print job stored on the external memory such as the device memory 114. Based on the restored data, the checking module 808 triggers the copy controller 158 of the multifunctional device 104 to resume printing of the earlier held print job. While being resumed, the earlier held print job switches from the held state to the active state for being printed to produce prints via the originally associated output media tray.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating" or "monitoring" or "detecting" or "determining" or "identifying" "or triggering" or "comparing" or "storing" or "restoring" or "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the methods may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for managing print jobs, each having one or more pages, on a printing device having a plurality of output media trays to produce prints, the method comprising:
    monitoring a print job being printed by the printing device, the print job is in an active state, wherein the print job is associated with a predetermined output media tray;
    detecting the print job being switched from the active state to a held state based on a status of at least one of a first set of printing resources, first print input conditions, and first print output conditions being negative for the print job;
    identifying a new incoming print job received at the printing device;
    comparing a first set of attributes of the print job in the held state with a second set of attributes of the new incoming print job;
    determining a status of each of a second set of printing resources, second print input conditions, and second print output conditions for the new incoming print job, based on the comparison; and
    triggering the printing device to print the new incoming print job for producing prints via an alternate output media tray based on the second print output conditions, while the print job in the held state is making the predetermined output media tray unavailable for producing prints.

2. The computer-implemented method according to claim 1, the step of determining further comprises:
    storing the first set of attributes and a print output status of the print job in the held state on an external memory based on the determined status being positive indicative of being favorable to print the new incoming print job.

3. The computer-implemented method according to claim 2, wherein the step of storing further comprises removing the print job in the held state from a local memory of the printing device based on the determined status being positive.

4. The computer-implemented method according to claim 1, wherein each of the first set of attributes and the second set of attributes includes at least one of media size, media type, ink or toner type, required finishing operation, and an associated output media tray.

5. The computer-implemented method according to claim 2, wherein the print output status refers to a count of pages of the print job in the held state that have been printed.

6. The computer-implemented method according to claim 2, wherein the method further comprises:
    detecting statuses of the first set of printing resources, the first print input conditions, and the first print output conditions being positive after the new incoming print job is complete or in a held state;
    restoring data including the first set of attributes and the print output status from the external memory to a local memory of the printing device based on the statuses being positive; and
    triggering the printing device to resume printing the print job in the held state based on the restored data, wherein the print job is switched from the held state to the active state to produce prints via the predetermined output media tray.

7. The computer-implemented method according to claim 6, wherein the step of restoring further comprises restoring the print job in a local memory of the printing device.

8. The computer-implemented method according to claim 1, wherein each of the first set of printing resources and the second set of printing resources includes at least one of media, media size, ink or toner, and a set of one or more finishing units.

9. The computer-implemented method according to claim 8, wherein the set of one or more finishing units includes at least one of stapler pins, binding spiral coils, and stitching wires.

10. The computer-implemented method according to claim 1, wherein each of the first print input conditions and the second print input conditions refers to an availability status of an input media path, wherein the availability status is either positive indicative of the input media path being unrestricted, or negative indicative of the input media path being restricted.

11. The computer-implemented method according to claim 1, wherein each of the first print output conditions and the second print output conditions refers to an availability status of an output media tray, wherein the availability status is either positive indicative of the output media tray being unrestricted or accessible, or negative indicative of the output media tray being restricted or inaccessible.

12. A print around device for managing print jobs, each having one or more pages, on a printing device having a plurality of output media trays to produce prints, wherein the print around device is in communication with an external memory, the print around device comprising:
  a computer, with a memory and a controller, implementing a checking module and an alter-execution module, wherein the checking module is to:
    monitor a print job being printed by the printing device, the print job is in an active state, wherein the print job is associated with a predetermined output media tray;
    detect the print job being switched from the active state to a held state based on a status of at least one of a first set of printing resources, first print input conditions, and first print output conditions being negative for the print job;
    identify a new incoming print job received at the printing device; and
    compare a first set of attributes of the print job in the held state with a second set of attributes of the new incoming print job;
    determine a status of each of a second set of printing resources, second print input conditions, and second print output conditions for the new incoming print job, based on the comparison; and
  wherein the alter-execution module is to trigger the printing device to print the new incoming print job for producing prints via an alternate output media tray, while the print job in the held state is making the predetermined output media tray unavailable for producing prints.

13. The print around device according to claim 12, wherein the checking module is to:
  detect statuses of the first set of printing resources, the first print input conditions, and the first print output conditions after the new incoming print job is complete or in a held state;
  restore data including the first set of attributes and a print output status from the external memory to a local memory of the printing device based on the detected statuses being positive; and
  trigger the printing device to resume printing the print job in the held state based on the restored data, wherein the print job is switched from the held state to the active state to produce prints via the predetermined output media tray.

14. The print around device according to claim 13, wherein the computer further implementing a preservation module to:
  remove the print job in the held state from the local memory of the printing device; and
  store the first set of attributes and the print output status of the print job in the held state on the external memory based on the determined status being positive indicative of being favorable to print the new incoming print job.

15. The print around device according to claim 13, wherein the print output status refers to a count of pages of the print job in the held state that have been printed.

16. The print around device according to claim 13, wherein each of the first set of attributes and the second set of attributes includes at least one of media size, media type, ink or toner type, required finishing operation, and an associated output media tray.

17. The print around device according to claim 12, wherein the alter-execution module is to trigger the printing device to associate the alternate output media tray with the new incoming print job based on the second print output conditions.

18. The print around device according to claim 12, wherein each of the first set of printing resources and the second set of printing resources includes at least one of media, media size, ink or toner, and a set of one or more finishing units.

19. The print around device according to claim 18, wherein the set of one or more finishing units includes at least one of stapler pins, binding spiral coils, and stitching wires.

20. The print around device according to claim 12, wherein each of the first print input conditions and the second print input conditions refers to an availability status of an input media path, wherein the availability status is either positive indicative of the input media path being unrestricted, or negative indicative of the input media path being restricted.

21. The print around device according to claim 12, wherein each of the first print output conditions and the second print output conditions refers to an availability status of an output media tray, wherein the availability status is either positive indicative of the output media tray being unrestricted or accessible, or negative indicative of the output media tray being restricted or inaccessible.

22. A non-transitory computer readable medium comprising computer-executable instructions for managing print jobs, each having one or more pages, on a printing device having a plurality of output media trays to produce prints, the non-transitory computer-readable medium comprising instructions for:
  monitoring a print job being printed by the printing device, the print job is in an active state, wherein the print job is associated with a predetermined output media tray;
  detecting the print job being switched from the active state to a held state based on a status of at least one of a first set of printing resources, first print input conditions, and first print output conditions being negative for the print job;
  identifying an new incoming print job received at the printing device;
  comparing a first set of attributes of the print job in the held state with a second set of attributes of the new incoming print job;
  determining a status of each of a second set of printing resources, second print input conditions, and second print output conditions for the new incoming print job, based on the comparison; and
  triggering the printing device to print the new incoming print job for producing prints via an alternate output media tray based on the second print output conditions, while the print job in the held state is making the predetermined output media tray unavailable for producing prints.

23. The non-transitory computer readable medium according to claim 22, the step of determining further comprises:
  storing the first set of attributes and a print output status of the print job in the held state on an external memory based on the determined status being positive indicative of being favorable to print the new incoming print job.

24. The non-transitory computer readable medium according to claim 23, wherein the step of storing further comprises removing the print job in the held state from a local memory of the printing device based on the determined status being positive.

25. The non-transitory computer readable medium according to claim 22, wherein each of the first set of attributes and the second set of attributes includes at least one of media size, media type, ink or toner type, required finishing operation, and an associated output media tray.

26. The non-transitory computer readable medium according to claim 23, wherein the print output status refers to a count of pages of the print job in the held state that have been printed.

27. The non-transitory computer readable medium of claim 23, wherein the non-transitory computer-readable medium comprises instructions for:
  detecting statuses of the first set of printing resources, the first print input conditions, and the first print output conditions being positive after the new incoming print job is complete or in a held state;
  restoring data including the first set of attributes and the print output status from the external memory to a local memory of the printing device based on the statuses being positive; and
  triggering the printing device to resume printing the print job in the held state based on the restored data, wherein the print job is switched from the held state to the active state to produce prints via the predetermined output media tray.

28. The non-transitory computer readable medium according to claim 27, wherein the step of restoring further comprises restoring the print job in the local memory of the printing device.

29. The non-transitory computer readable medium according to claim 22, wherein each of the first set of printing resources and the second set of printing resources includes at least one of media, media size, ink or toner, and a set of one or more finishing units.

30. The non-transitory computer readable medium according to claim 29, wherein the set of one or more finishing units includes at least one of stapler pins, binding spiral coils, and stitching wires.

31. The non-transitory computer readable medium according to claim 22, wherein each of the first print input conditions and the second print input conditions refers to an availability status of an input media path, wherein the availability status is either positive indicative of the input media path being unrestricted, or negative indicative of the input media path being restricted.

32. The non-transitory computer readable medium according to claim 22, wherein each of the first print output conditions and the second print output conditions refers to an availability status of an output media tray, wherein the availability status is either positive indicative of the output media tray being unrestricted or accessible, or negative indicative of the output media tray being restricted or inaccessible.

* * * * *